United States Patent

Oishi et al.

[11] Patent Number: 5,946,105
[45] Date of Patent: *Aug. 31, 1999

[54] FACSIMILE APPARATUS AND CONTROL METHOD THEREFOR

[75] Inventors: Kazuomi Oishi; Masaya Kondo; Akemi Nishimaki, all of Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/521,293

[22] Filed: Aug. 29, 1995

[30] Foreign Application Priority Data

| Aug. 31, 1994 | [JP] | Japan | 6-207207 |
| Aug. 31, 1994 | [JP] | Japan | 6-230720 |
| Aug. 22, 1995 | [JP] | Japan | 7-213532 |

[51] Int. Cl.$^6$ .............. G06F 15/00; H04N 1/00; H04N 1/40
[52] U.S. Cl. .......... 358/434; 358/404; 358/435; 358/470; 395/110
[58] Field of Search ............. 358/434, 404, 358/470, 471, 401, 443, 444, 468, 462, 435, 436, 442; 395/110, 150, 112, 114, 115, 101, 171, 170

[56] References Cited

U.S. PATENT DOCUMENTS

| 4,594,674 | 6/1986 | Boulia et al. | 364/523 |
| 5,283,665 | 2/1994 | Ogata | 358/434 |
| 5,367,618 | 11/1994 | Ishida | 395/110 |
| 5,410,640 | 4/1995 | Mrikawa et al. | 395/110 |
| 5,444,829 | 8/1995 | Kawabata et al. | 395/100 |
| 5,522,028 | 5/1996 | Nagata et al. | 395/165 |
| 5,570,459 | 10/1996 | Kam | 395/110 |
| 5,592,593 | 1/1997 | Speed | 395/110 |
| 5,721,812 | 2/1998 | Mochizuki | 395/110 |
| 5,748,861 | 5/1998 | Kashiwazaki et al. | 395/110 |

*Primary Examiner*—Edward L. Coles
*Assistant Examiner*—Mark E. Wallerson
*Attorney, Agent, or Firm*—Fitzpatrick, Cella, Harper & Scinto

[57] ABSTRACT

There are provided a facsimile apparatus in which fonts of plural languages each including plural characters need not be permanently stored from the beginning, and a control method therefor. A data request from the facsimile apparatus is recognized by an information processing apparatus, which in response transfers data meeting the request of the facsimile apparatus thereto, among the data managed in the information processing apparatus, and the facsimile apparatus is enabled to manage and utilize thus transferred data, whereby the facsimile apparatus can effectively utilize the memory.

12 Claims, 13 Drawing Sheets

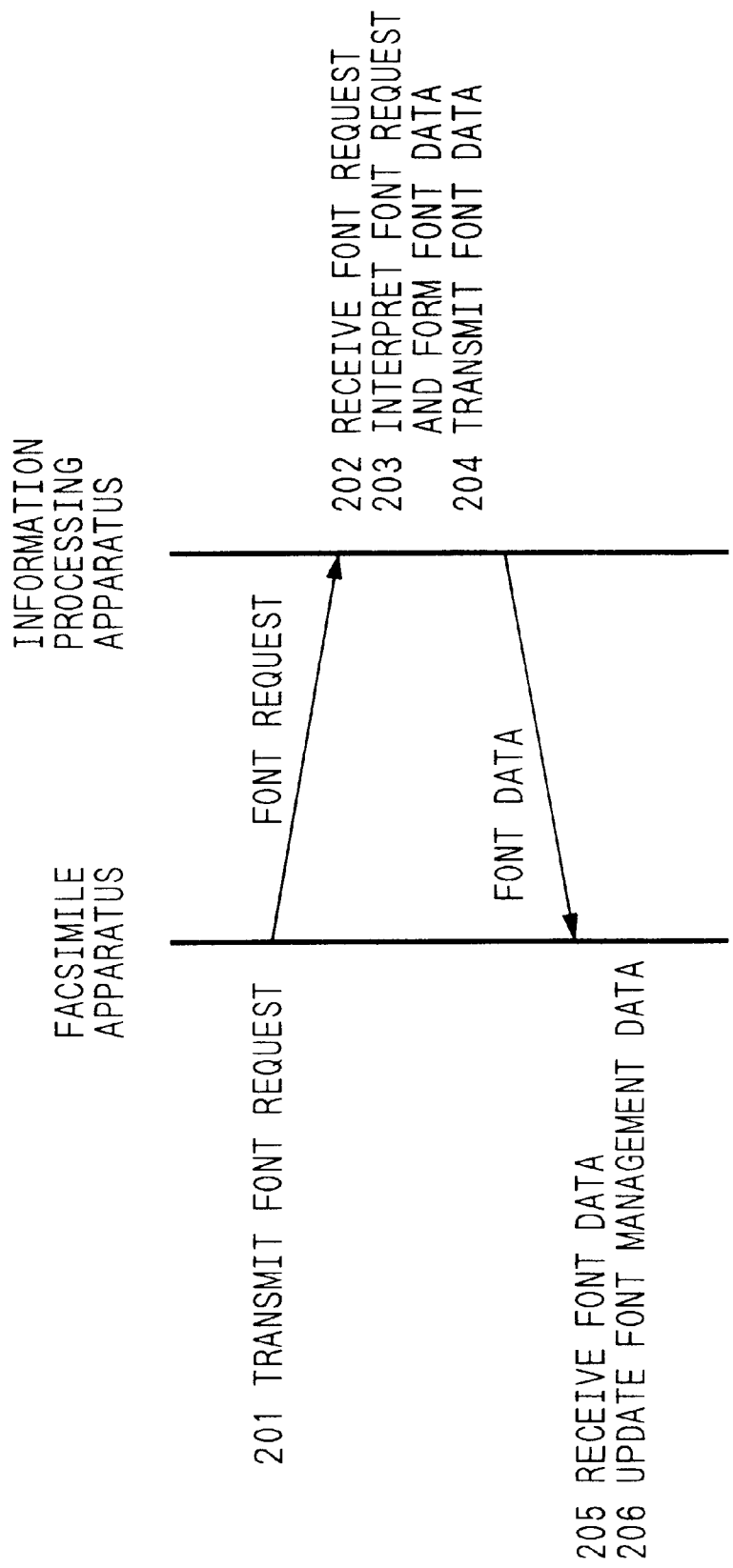

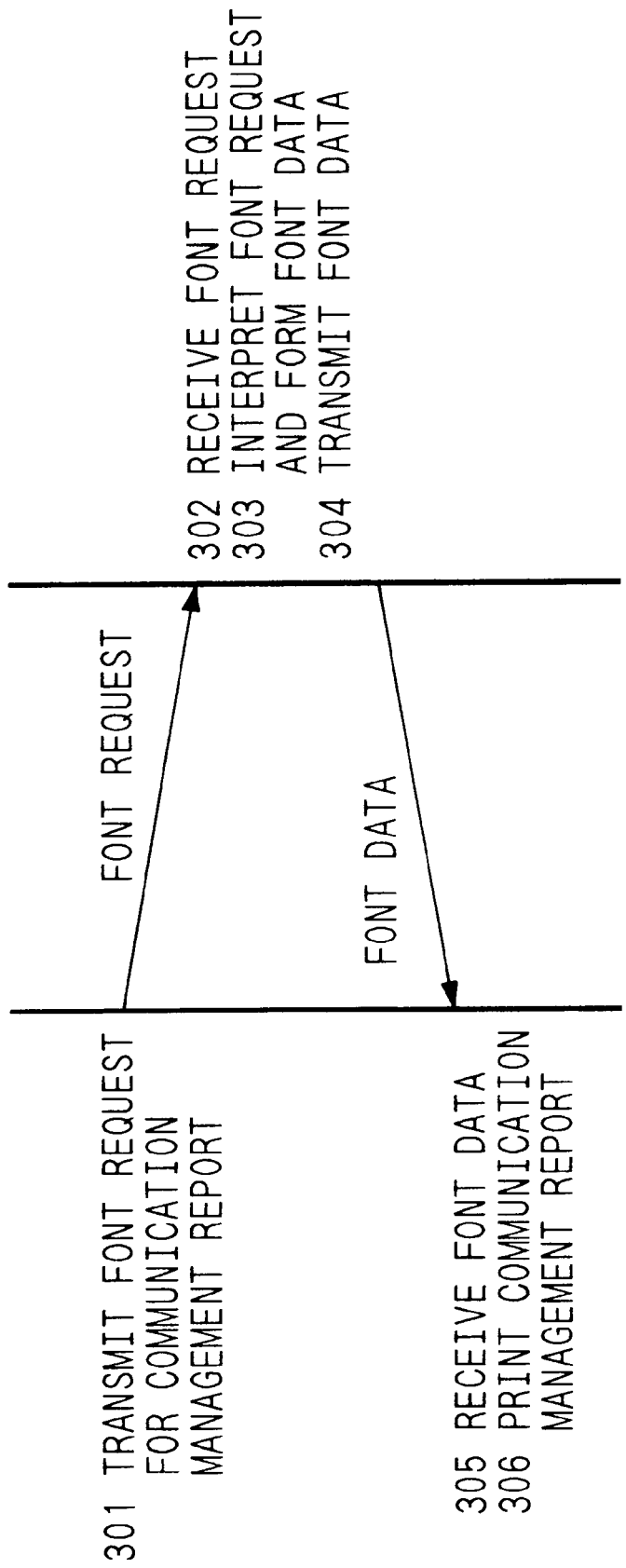

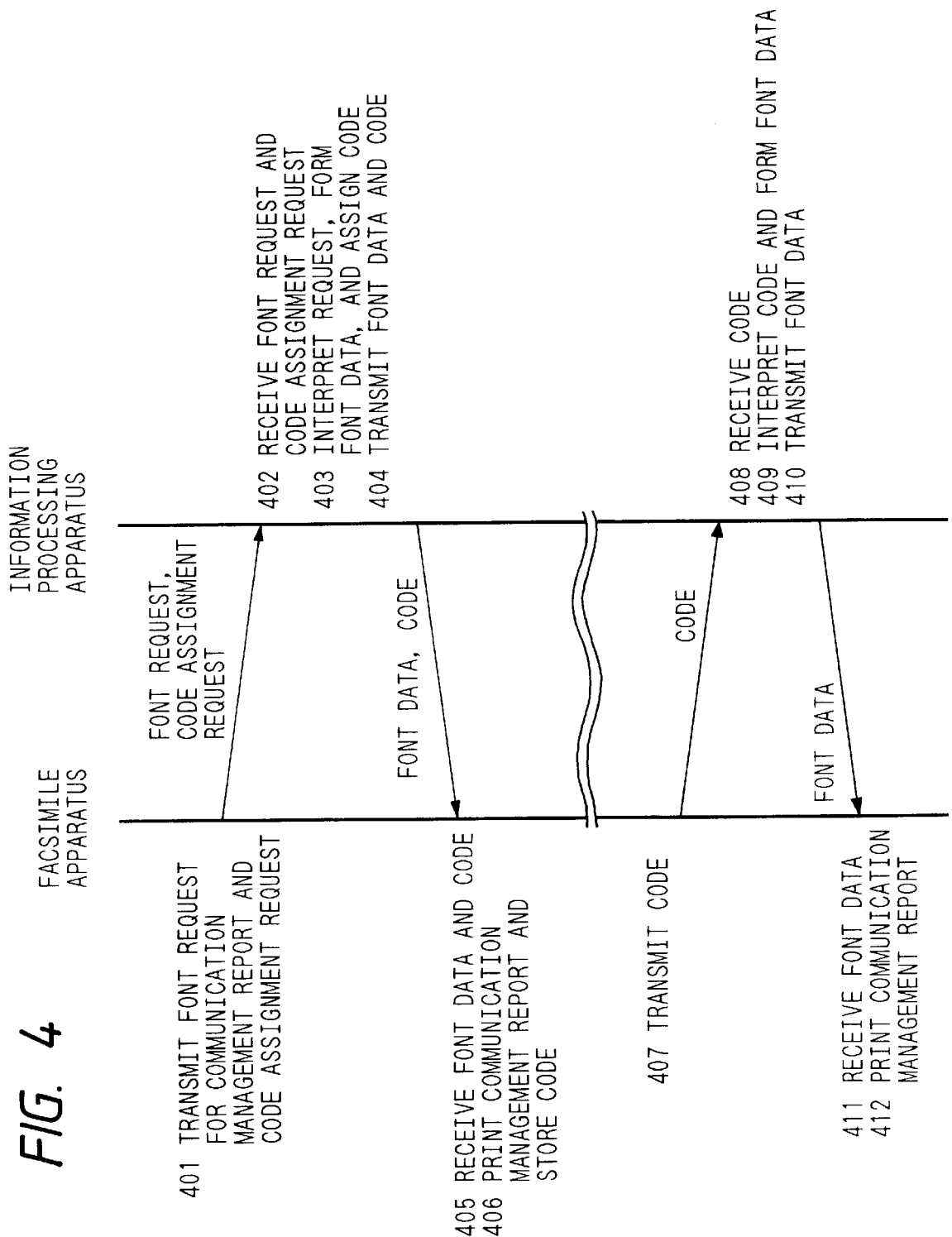

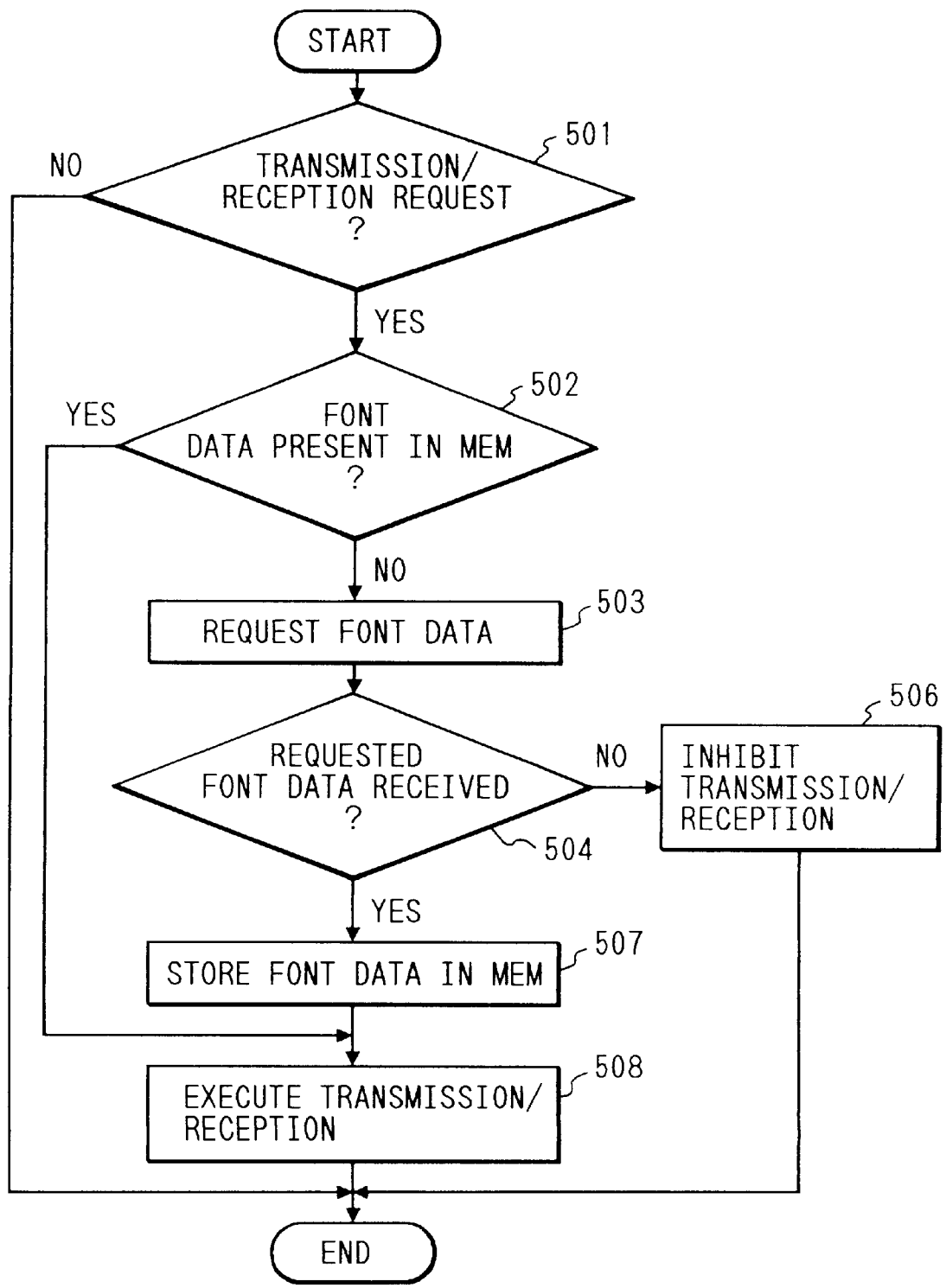

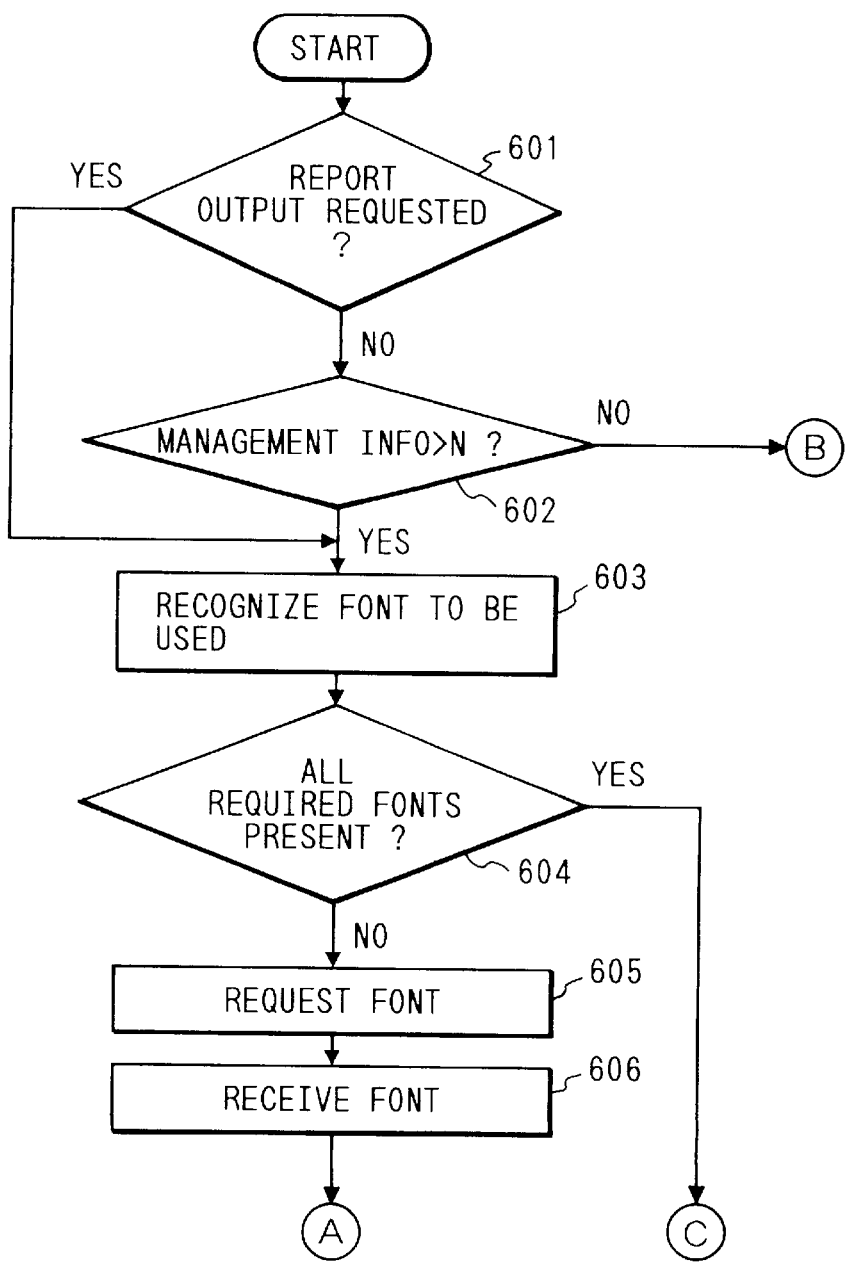

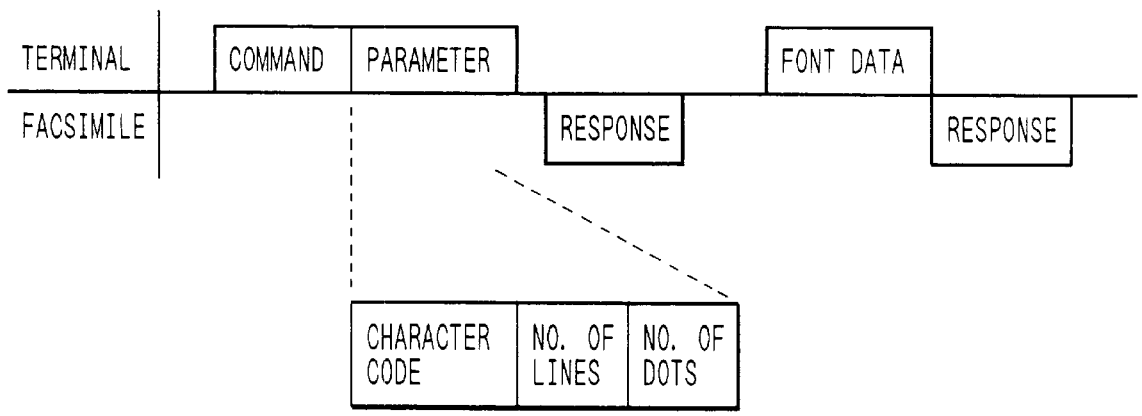

FACSIMILE APPARATUS AND CONTROL METHOD THEREFOR

BACKGROUND OF THE INVENTION

1. Field of the Invention

The present invention relates to a facsimile apparatus capable of receiving font data from an external apparatus and a control method therefor.

2. Related Background Art

Conventional facsimile apparatus is usually provided with messages to be displayed on a display unit such as an LCD (liquid crystal display) in the operation panel, and a font (set of characters of same size and style) to be used for various reports for example indicating the results of communication. Particularly in Europe and in the U.S., where the facsimile apparatus is required to cope with plural languages, fonts of plural languages are installed in the same apparatus for meeting such requirement.

Also in case an information processing apparatus effects image data transmission by sending character code data to a facsimile apparatus which converts such transmitted character code data into image data, such conversion to the image data has been achieved by the font provided in advance in the facsimile apparatus.

In order to avoid lack of the font data desired by the user in such case, the facsimile apparatus is often provided with plural font tables.

Such conventional facsimile apparatus designed for plural languages is provided therein with the fonts of plural languages, but such fonts contain only scarcely used characters and languages which are never used by the user. Such unused characters and languages and the memories therefor are considered to be wasted, but the installation of plural languages each including a plurality of characters is unavoidable since the language to be used cannot be predicted in advance.

With the recent penetration of the information processing apparatus such as personal computers, the document preparation is commonly done with such information processing apparatus. As a result, the facsimile apparatus is increasingly connected with the information processing apparatus through electrical communication means, for the purpose, for example, of transmitting document data on the information processing apparatus by direct conversion into a facsimile image. Also with the recent development in performance of the information processing apparatus, there are already made available those provided with fonts of high quality and also with rasterizing ability for converting such fonts into a bit map (raster data) matching the resolution of the display or the printer.

Such conventional configuration has been associated with a drawback of requiring a memory of a large capacity in order to prepare plural font tables in the apparatus, thus leading to an elevated production cost. Besides, in case of transferring font data, prepared independently by the user, to the facsimile apparatus for transmission of the corresponding image data, or in case of using font data, though not specific to the user but different from those provided in the facsimile apparatus in the language system, in style or in character size, the font tables provided in the facsimile apparatus are of no use.

SUMMARY OF THE INVENTION

In consideration of the above-mentioned drawbacks of the prior art, an object of the present invention is to provide a data communication method, a data communication system, a facsimile apparatus and an information processing apparatus which do not require permanent storage of fonts of plural languages each containing a plurality of characters.

Another object of the present invention is to provide a facsimile apparatus capable of flexibly adapting to the font data desired by the user, without an increase in the capacity of the font memory.

The above-mentioned objects can be attained according to the present invention, by a data communication method which comprises connecting an information processing apparatus and a facsimile apparatus through electric communication means capable of data transmission and reception, recognizing a data request from said facsimile apparatus by said information processing apparatus, transferring data, meeting the request of said facsimile apparatus, among those managed by said information processing apparatus to said facsimile apparatus, controlling said facsimile apparatus so as to enable management and utilization of the data transferred from said information processing apparatus, and effecting adaptive communication of a font between said information processing apparatus and said facsimile apparatus, whereby said facsimile apparatus can utilize the font managed by said information processing apparatus in the display, printing or transmission.

Also the foregoing objects can be attained, according to the present invention, by a data communication system including an information processing apparatus and a facsimile apparatus connected through electric communication means capable of data transmission and reception, said system comprising recognition means for recognizing, by said information processing apparatus, a data request from said facsimile apparatus; transfer means for transferring data, meeting the request of said facsimile apparatus, among those managed by said information processing apparatus, to said facsimile apparatus; and control means for enabling said facsimile apparatus to effect management and utilization of the data transferred by said transfer means, wherein a font is adaptively communicated between said information processing apparatus and said facsimile apparatus and the font managed by said information processing apparatus can be utilized by said facsimile apparatus in display, printing or transmission.

Furthermore, the foregoing objects can be attained, according to the present invention, by a facsimile apparatus capable of data transmission and reception with an information processing apparatus connected through electrical communication means, comprising control means for effecting control so as to enable management and utilization of data transferred among those managed by said information processing apparatus, wherein a font is adaptively communicated with said information processing apparatus and the font managed by said information processing apparatus can be utilized for display, printing or transmission.

Furthermore, the foregoing objects can be attained, according to the present invention, by an information processing apparatus capable of data transmission and reception with a facsimile apparatus connected through electrical communication means, comprising recognition means for recognizing data request from said facsimile apparatus, and transfer means for transferring, among data managed by said information processing means, data meeting the request of said facsimile apparatus, wherein a font is adaptively communicated with said facsimile apparatus and said managed font is made utilizable by said facsimile apparatus in display, printing or transmission.

For attaining the foregoing objects, it is desirable, in said data communication system, to provide memory means for storing, in said facsimile apparatus, the data transferred thereto from said information processing apparatus, and to store said transferred data in said memory means, whereby said data can be always utilized by said facsimile apparatus in display, printing or transmission.

Also for attaining the foregoing objects, it is desirable, in said data communication system, when necessitated, to transfer data from said information processing apparatus to said facsimile apparatus by said transfer means, whereby said data can be utilized by said facsimile apparatus in display, printing or transmission.

Also for attaining the foregoing objects, it is desirable, in said data communication system, to provide code assignment means for assigning an identifiable code to a font of characters which are normally utilized collectively, and to use the code assigned by said code assignment means as the data request when necessitated.

Also for attaining the foregoing objects, it is desirable, in said data communication system, to provide memory means for storing, in said facsimile apparatus, data transferred thereto from said information processing apparatus by said transfer means when necessitated, and to store said transferred data in said memory means, whereby said data can be always utilized by said facsimile apparatus in display, printing or transmission.

Also for attaining the foregoing objects, it is desirable, in said facsimile apparatus, to provide memory means for storing the data transferred from said information processing apparatus and to store said transferred data in said memory means, whereby said data can be always utilized for display, printing or transmission.

Also for attaining the foregoing objects, it is desirable, in said facsimile apparatus, to render the data transferred from said information processing apparatus when necessitated, utilizable for display, printing or transmission.

Also for attaining the foregoing objects, it is desirable in said facsimile apparatus, to provide code assignment means for assigning an identifiable code to a font of characters which are normally utilized collectively, and, when necessitated, to utilize the code assigned by said code assignment means as the data request.

Also for attaining the foregoing objects, it is desirable, in said facsimile apparatus, to provide memory means for storing data transferred from said information processing apparatus when necessitated, and to store said transferred data in said memory means, whereby said data can be always utilized for display, printing or transmission.

In the above-mentioned data communication method and data communication system, a data request from the facsimile apparatus is recognized by the information processing apparatus through the recognizing means, whereupon data meeting the request of said facsimile apparatus is transferred, among the data managed by said information processing apparatus, by said transfer means, and said facsimile apparatus is so controlled by the control means as to enable management and utilization of the data transferred by said transfer means. Also a font is adaptively communicated between said information processing apparatus and said facsimile apparatus, whereby the font managed by said information processing apparatus can be utilized by said facsimile apparatus in display, printing or transmission. It therefore becomes unnecessary to permanently store, in advance, fonts of plural languages each including a plurality of characters.

In the above-mentioned facsimile apparatus, a font is adaptively communicated with said information processing apparatus, whereby the font managed by said information processing apparatus can be utilized for display, printing or transmission. It therefore becomes unnecessary to permanently store, in advance, fonts of plural languages each including a plurality of characters.

In the above-mentioned information processing apparatus, a data request from the facsimile apparatus is recognized and data meeting the request of said facsimile apparatus are sent among those managed in the information processing apparatus. Thus a font is adaptively communicated with said facsimile apparatus, whereby the managed font can be utilized by said facsimile apparatus in display, printing or transmission. It therefore becomes unnecessary to permanently store, in advance, fonts of plural languages each including a plurality of characters.

Furthermore, the foregoing objects can be attained, according to the present invention, by a facsimile apparatus adapted to receive character data from an external apparatus, to convert said character data into image data and to effect facsimile transmission of said image data, comprising interface means for effecting transmission and reception of information with said external apparatus, conversion means for converting the character data received from said external apparatus into image data, transmission means for sending the image data, converted by said conversion means, to a communication line, first memory means for storing font data to be used in the conversion by said conversion means, and alteration means for altering the font data stored in said first memory means, according to the information transmitted from said external apparatus.

In the foregoing configuration, the font data stored in the first memory means and used for converting the received character data into image data are altered according to the information transmitted from the external apparatus.

BRIEF DESCRIPTION OF THE DRAWINGS

FIG. 2 is a communication protocol chart showing the data flow between the facsimile apparatus and the information processing apparatus in case a non-default font is used in said data communication system;

FIG. 3 is a communication protocol chart showing the data flow between the facsimile apparatus and the information processing apparatus in case of printing a communication management report in a data communication system constituting a second embodiment of the present invention;

FIG. 4 is a communication protocol chart showing the data flow between the facsimile apparatus and the information processing apparatus in case of printing a communication management report plural times in a data communication system constituting a third embodiment of the present invention;

FIG. 5 is a flow chart showing a transmission/reception sequence;

FIG. 6 is comprised of

FIGS. 6A and 6B showing flow charts illustrating a sequence for generating a communication management report;

FIG. 13 is a chart showing transmission/reception of data and response relating to font data alteration between the terminal device 110 and the facsimile apparatus; and FIG. 14 is a chart showing the structure of a font data management table 108.

DESCRIPTION OF THE PREFERRED EMBODIMENTS

Now the present invention will be clarified in detail by preferred embodiments thereof, with reference to the attached drawings.

[First embodiment]

Figure 1:
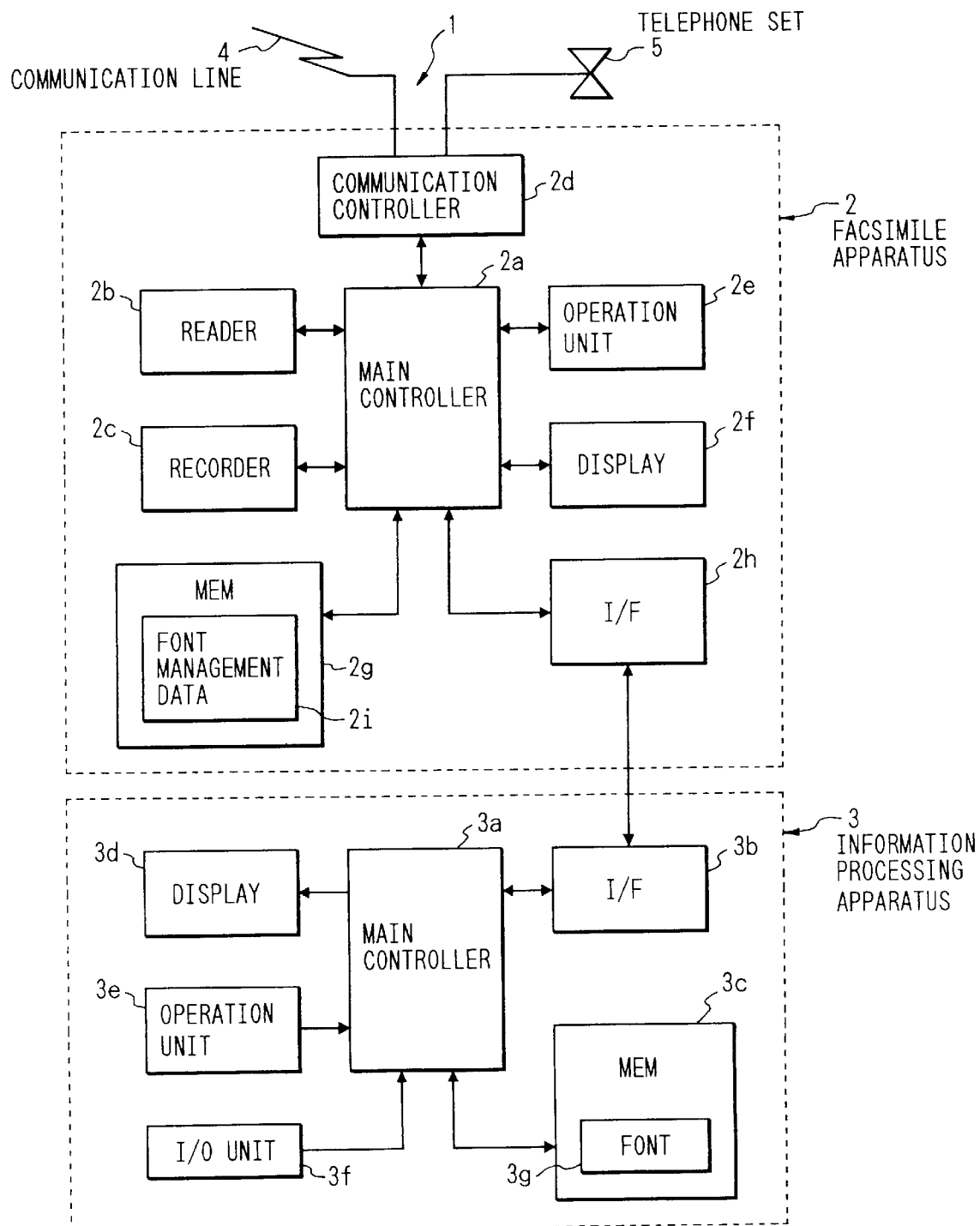
FIG. 1 is a block diagram showing the configuration of a data communication system constituting a first embodiment of the present invention.

At first a first embodiment of the present invention will be explained with reference to FIGS. 1 and 2. FIG. 1 is a block diagram showing the configuration of a data communication system constituting a first embodiment of the present invention, wherein the data communication system 1 consists of a facsimile apparatus 2 and an information processing apparatus (for example a personal computer (PC) 3, connected through electrical communication means capable of data transmission and reception.

The facsimile apparatus 2 is provided with a main control unit 2a; a reader unit 2b; a recorder unit 2c; a communication control unit 2d; an operation unit 2e; a display unit 2f; a memory 2g for storing transmitted or received data; and an interface (I/F) unit 2h. The main control unit 2a controls the entire facsimile apparatus 2. The reader unit 2b reads image information. The recorder unit 2c prints image information for example by an ink jet process or an electro-photographic process. The communication control unit 2d is connected to a communication line 4 and a telephone set 5 and controls the communication. The operation unit 2e is provided for entering various signals for controlling the facsimile apparatus 2, and is provided with various keys (not shown). The display unit 2f, for displaying various information, is composed for example of an LCD (liquid crystal display) device. The memory 2g stores font management data 2i, including fonts and codes. The I/F 2h serves to effect signal exchange with the information processing apparatus 3.

The information processing apparatus 3 is provided with a main control unit 3a; an interface (I/F) unit 3b; a memory 3c; a display unit 3d; an operation unit 3e and an external input/output (I/O) unit 3f. The main control unit 3a controls the entire information processing apparatus 3. The I/F 3b effects signal exchange with the facsimile apparatus 2. The memory 3c stores a font 3g, which can be provided in advance in the information processing apparatus or can be loaded from a floppy disk supplied to the user together with the information processing apparatus. The display unit 3d, for displaying various information, is composed for example of a liquid crystal display. (LCD) device. The operation unit 3e is provided for entering various signals for controlling the information processing apparatus and is provided with various keys (not shown). The external I/O unit 3f serves to enter and release various signals.

It is assumed in the present system that the correlation of the characters, such as alphabets and numerals, of each language and corresponding codes (numbers of character codes assigned one-to-one to the characters) is stored, as a part of the font management data 2i, in the memory 2g of the facsimile apparatus 2, and codes are also assigned and stored for fixed messages (trains of characters for example alphabets) to be displayed on the display unit 2f or printed in the recorder unit 2c on a recording sheet. In case of display or printing of a message by the display unit 2f or the recorder unit 2c, the message is uniquely determined by designation of a language and a code (corresponding to a group of codes corresponding to plural characters), so that the main control unit 2a effects an operation of reading font corresponding to the train of said codes from the font management data 2i and sending said codes to the display unit 2f or the recorder unit 2c.

FIG. 2 is a communication protocol chart showing the data flow in the present system between the facsimile apparatus 2 and the information processing apparatus 3 in case of using a non-default font, wherein the left-hand side and the right-hand side respectively indicate processes effected by the facsimile apparatus 2 and by the information processing apparatus 3, while the central portion indicates the content and direction of data communicated between the facsimile apparatus 2 and the information processing apparatus 3, the processes being executed in the order from top to bottom.

In the following there will be explained, with reference to FIG. 2, the operation of the present system in case of using the facsimile apparatus 2 with a non-default font (for example font of French language) different from the font of a language provided as a default (for example English font), by requesting a font (for example French alphabets) managed by the information processing apparatus 3 and utilizing the font transferred therefrom. Said request may be made by a direct instruction of the user, or by the facsimile apparatus when it recognizes the necessity for the font.

Referring to FIG. 2, the main control unit 2a of the facsimile apparatus 2 sends a request for a font, different from the font of default, to the information processing apparatus 3 through the I/F unit 2h (201: font request transmission). Said request for the font may be made for each character, or for a group of plural characters, or by a code corresponding to a predetermined group of frequently used plural characters.

Then the main control unit 3a of the information processing apparatus 3 receives the font request, transmitted from the facsimile apparatus 2, through the I/F unit 3b (202: font request reception). Then the main control unit 3a of the information processing apparatus 3 interprets the received font request, and forms font data of a format required by the facsimile apparatus 2, from the font stored in the memory 3c or that supplied to the information processing apparatus 3 through the external I/O unit 3f. For example, there is formed a bit map of 5 dots (horizontal)×11 dots (vertical) as the font data for display by the display unit 2f, or a bit map of 32 dots (horizontal)×32 dots (vertical) as the font data for printing by the recorder unit 2c (203: request interpretation and data formation). Then the main control unit 3a of the information processing apparatus 3 sends thus formed font data to the facsimile apparatus 2 through the I/F unit 3b (204: font data transmission).

The main control unit 2a of the facsimile apparatus 2 receives the font data transmitted from the information processing apparatus 3, through the I/F unit 2h (205: font data reception), and renews the font management data 2i in the memory 2g, utilizing the received font data. More specifically, codes assigned in advance to the French alphabets and the content of the corresponding font are memorized in mutually correlated manner. For subsequent display by the display unit 2f or printing by the recorder unit 2c on the recording sheet, information indicating the use of the added font (French language) is also stored as the font management data 2i.

[Second embodiment]

In the following there will be explained a 2nd embodiment of the present invention, with reference to FIG. 3. In the following description reference is made to FIG. 1, as the configuration of the data communication system of the present embodiment is same as that of the foregoing 1st embodiment.

FIG. 3 is a communication protocol chart showing the data flow in the present embodiment between the facsimile apparatus 2 and the information processing apparatus 3 in case of printing a communication management report, wherein the left-hand side and the right-hand side respectively indicate processes effected by the facsimile apparatus 2 and the information processing apparatus 3, while the central portion indicates the content and direction of data communicated between the facsimile apparatus 2 and the information processing apparatus 3, the processes being executed in the order from top to bottom.

In the following there will be explained, with reference to FIG. 3, the operation of the present system in case of printing a communication management report by the recorder unit 2c of the facsimile apparatus 2, by requesting a font of the characters to be used in said report and utilizing the transmitted font data for printing.

Referring to FIG. 3, the main control unit 2a of the facsimile apparatus 2 sends a request for the font of the characters required for the image formation of the communication management report, to the information processing apparatus 2 through the I/F unit 2h (301: transmission for font for the communication management report).

In response, the main control unit 3a of the information processing apparatus 3 receives the font request, transmitted from the facsimile apparatus 2, through the I/F unit 3b (302: font request reception). Then the main control unit 3a of the information processing apparatus 3 interprets the received font request, and forms font data of a format required by the facsimile apparatus 2, from the font 3g stored in the memory 3c or the font supplied to the information processing apparatus 3 through the external I/O unit 3f (303: request interpretation and data formation), and sends thus formed font data to the facsimile apparatus 2 through the I/F unit 3b (304: font data transmission).

Then the main control unit 2a of the facsimile apparatus 2 receives the font data transmitted from the information processing apparatus 3, through the I/F unit 2h (305: font data reception). Then the main control unit 2a of the facsimile apparatus 2 prepares image data of the communication management report, utilizing the received font data, and causes the recorder unit 2c to effect printing on the recording sheet (306).

The present embodiment enables more effective utilization of the memory 2g in comparison with the foregoing 1st embodiment, since all the font data of the necessary characters need not be obtained in advance from the information processing apparatus 3.

[Third embodiment]

In the following there will be explained a 3rd embodiment of the present invention, with reference to FIG. 4. In the following description reference is made to FIG. 1, as the configuration of the data communication system of the present embodiment is same as that of the foregoing 1st embodiment.

FIG. 4 is a communication protocol chart showing the data flow in the present embodiment between the facsimile apparatus 2 and the information processing apparatus 3 in case of printing a communication management report plural times, wherein the left-hand side and the right-hand side respectively indicate processes effected by the facsimile apparatus 2 and the information processing apparatus 3, while the central portion indicates the content and direction of data communicated between the facsimile apparatus 2 and the information processing apparatus 3, the processes being executed in the order from top to bottom.

In the following there will be explained, with reference to FIG. 4, the operation of the present system in case of assigning an identifiable code for a group of font data which are known to be collectively used as in the communication management report or in the transmission result report, and sending said code as the data request when necessitated.

Referring to FIG. 4, the main control unit 2a of the facsimile apparatus 2 sends a request for the font of characters required for the image formation of the communication management report and for a code to be assigned thereto, to the information processing apparatus 3 through the I/F unit 2h (401: request transmission for font for communication management report and a code to be assigned thereto).

In response the main control unit 3a of the information processing apparatus 3 receives the request for the font and the code assignment, transmitted from the facsimile apparatus 3, through the I/F unit 3b (402: reception of request for font and code assignment). Then the main control unit 3a of the information processing apparatus 3 interprets the received font request, then forms font data of a format required by the facsimile apparatus 2, from the font 3g stored in the memory 3c or the font supplied to the information processing apparatus 3 through the external I/O unit 3f, also assigns a specific code to the entire font and effects storage thereof (403: request interpretation, data formation and code assignment). Then the main control unit 3a of the information processing apparatus 3 sends thus formed font data and the code assigned thereto to the facsimile apparatus 2 through the I/F unit 3b (404: transmission of font and code).

Then the main control unit 2a of the facsimile apparatus 2 receives the font data and the code, transmitted from the information processing apparatus 3, through the I/F unit 2h (405: reception of font data and code), then forms image data of the communication management report, utilizing the received font data, and causes the recorder unit 2c to effect printing on the recording sheet. It also stores, in the font management data 2i, that the transmitted code indicates the font of the characters required for the communication management report (406: printing of communication management report and code storage). Then the main control unit 2a of the facsimile apparatus 2 sends the code stored in the memory 2g to the information processing apparatus 3 through the I/F unit 2h, when the printing of the communication management report is necessitated (407: code transmission).

In response, the main control unit 3a of the information processing apparatus 3 receives the code transmitted from the facsimile apparatus 2, through the I/F unit 3b (408: code reception). The main control unit 3a of the information processing apparatus 3 interprets the received code (request for font for the communication management report), and forms font data of a format required by the facsimile apparatus 2, from the font 3g stored in the memory 3c (409:

request interpretation and data formation), and sends said font data to the facsimile apparatus 2 through the I/F unit 3b (410: font data transmission).

Then the main control unit 2a of the facsimile apparatus 2 receives the font data transmitted from the information processing apparatus 3, through the I/F unit 2h (411: font data reception), then forms image data of the communication management report, utilizing the received font data, and causes the recorder unit 2c to effect printing (412: printing of communication management report).

The present embodiment enables to reduce the total process time because the data amount of the font request sent from the facsimile apparatus 2 to the information processing apparatus 3 is reduced in comparison with the foregoing embodiments where the request is made individually for each required character.

The font may be in any format such as bit map font or outline font, as long as there can be formed data of a format required by the facsimile apparatus.

In addition to the foregoing embodiments, the present invention is applicable also to data to be transmitted to another connected facsimile apparatus, such as a cover page or a TTI.

In case the information processing apparatus is not provided with the requested font, said apparatus can designate a mode of no transmission or a mode of transmitting a similar font.

As explained in the foregoing, in the data communication method and the data communication system of the present invention, the data request from the facsimile apparatus is recognized by the information processing apparatus, which, in response, transfers data meeting the request of said facsimile apparatus, among the data managed by said information processing apparatus, to said facsimile apparatus by the transfer means. Said facsimile apparatus is so controlled by the control means as to enable management and utilization of the data transferred by said transfer means, and the font is adaptively communicated between said information processing apparatus and said facsimile apparatus whereby the font managed by said information processing apparatus can be utilized by said facsimile apparatus in display, printing or transmission. It therefore becomes unnecessary to permanently store, in advance, fonts of plural languages each including a plurality of characters.

Also the facsimile apparatus of the present invention is capable of adaptively communicating the font with the information processing apparatus, whereby the font managed by said information processing apparatus can be utilized in display, printing or transmission. It therefore becomes unnecessary to permanently store, in advance, fonts of plural languages each including a plurality of characters.

Furthermore, the information processing apparatus of the present invention is capable of recognizing the data request from the facsimile apparatus, transferring the data meeting the request of said facsimile apparatus, among the data managed by the information processing apparatus, to said facsimile apparatus, and communicating the font in adaptive manner with said facsimile apparatus, whereby said managed fonts can be utilized by the facsimile apparatus in display, printing or transmission. It therefore becomes unnecessary to permanently store, in advance, fonts of plural languages each including a plurality of characters.

[4th embodiment]

In the following there will be explained a 4th embodiment with reference to flow charts shown in FIGS. 5, 6A, 6B and 7, of which corresponding programs are stored in a program area of the memory 2g and executed by the main control unit 2a. In a step 501, the main control unit 2a of the facsimile apparatus 2 discriminates if a request for transmission/reception is present, and, if present, discriminates if the font data are present in the font management data area 2i of the memory, in a step 502. In the absence of the font data, font data are requested to the PC (503).

Then the main control unit 2a discriminates whether the requested font data have been received (504), and, if received, stores the received font data in the font management area 2i of the memory (507) and effects transmission/reception operation (508). On the other hand, in case the requested font data cannot be received, the transmission/reception operation is inhibited (506) because the sender information, communication management information, transmission result information, display information etc. cannot be developed into graphic image and the man-machine interface becomes significantly inefficient.

Figure 6B:
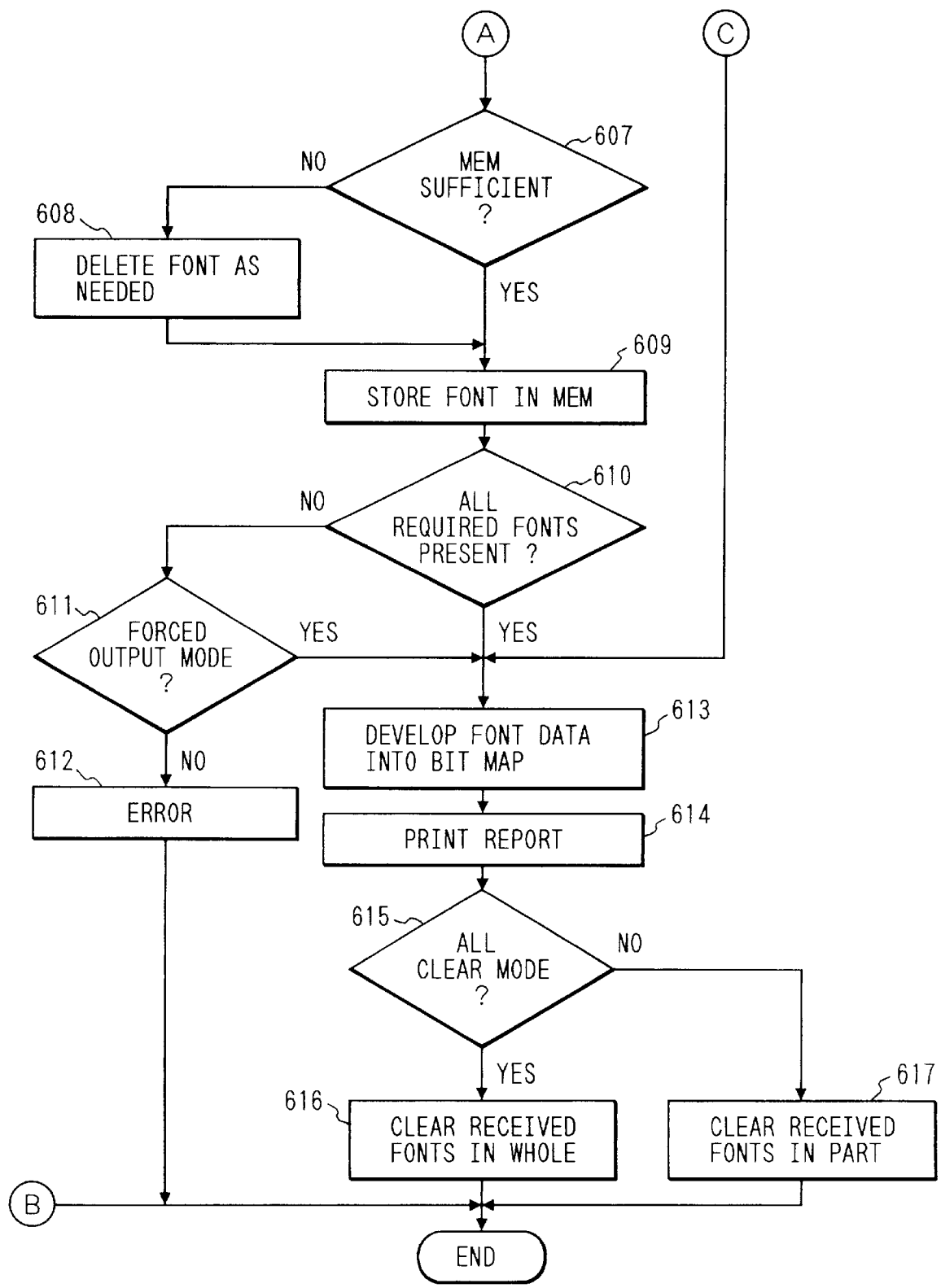

In the following explained is the output of communication management information, with reference to FIGS. 6A and 6B. Said information includes name and telephone number of the destination, communication mode, result of communication and error information in the past 40 communications, and is accumulated in the memory 2g.

The main control unit 2a discriminates whether the output of the communication management report has been requested by the operation unit 2e (601), and, if not, discriminates whether the number of the communication management information has exceeded a predetermined number N (for example 40 communications) (602). If not, the sequence is terminated.

On the other hand, if the output of the communication management report has been requested or if the number of the communication management information has exceeded the predetermined number N, the main control unit 2a recognizes the fonts to be used (603) and discriminates whether all the fonts to be used are available in the facsimile apparatus (604). If all the fonts are available, it reads and develops the font data into a dot image (613) and causes the recorder unit 2c to print the communication management information as a communication management report of a predetermined format (614).

If the step 604 identifies that all the fonts to be used are not available, a step 605 requests the necessary font to the information processing apparatus. Said request may be made, as explained before, in the unit of each character, in the unit of plural characters or by a code corresponding to plural characters.

A step 606 effects reception of the font from the information processing apparatus, then a step 607 discriminates whether the received font can be stored in the memory 2g, and, if storable, a step 609 effects storage of the received font in the memory 2g. If the step 607 identifies that the received font is not storable in the memory 2g, a step 608 deletes the fonts which are stored in the memory 2g and are not presently used, according to a predetermined order of priority such as those of low frequency of use or those different in style, so as to secure a memory capacity for storing the received fonts.

Then a step 610 discriminates whether all the fonts to be used are made available. If all the fonts are not ready, a step 611 discriminates whether a forced output mode has been designated, and, if not, a step 612 effects an error process to inform the user of a fact that the communication management report cannot be issued.

If the step 610 identifies that all the fonts are ready, a step 613 reads the font data from the memory 2g, develops said font data into a dot image and causes the recorder unit 2c to print the communication management information as a communication management report of a predetermined format. Then, a step 615 discriminates whether there has been designated an all erasure mode for erasing the received fonts each time, and, if designated, a step 616 deletes all the received fonts. If the all erasure mode is not designated, there is executed a partial erasure for erasing fonts which have not been used at least for a predetermined number of times (for example twice) within a predetermined time (for example 24 hours). Such all erasure mode is effective for the users who do not print the communication management report often, as the font memory area can be utilized for example for substituted reception or memory transmission. On the other hand, if the all erasure mode is not designated, the necessary fonts may probably remain in the memory, so that the total process time can be reduced as the time for font data reception can be saved.

Figure 7:
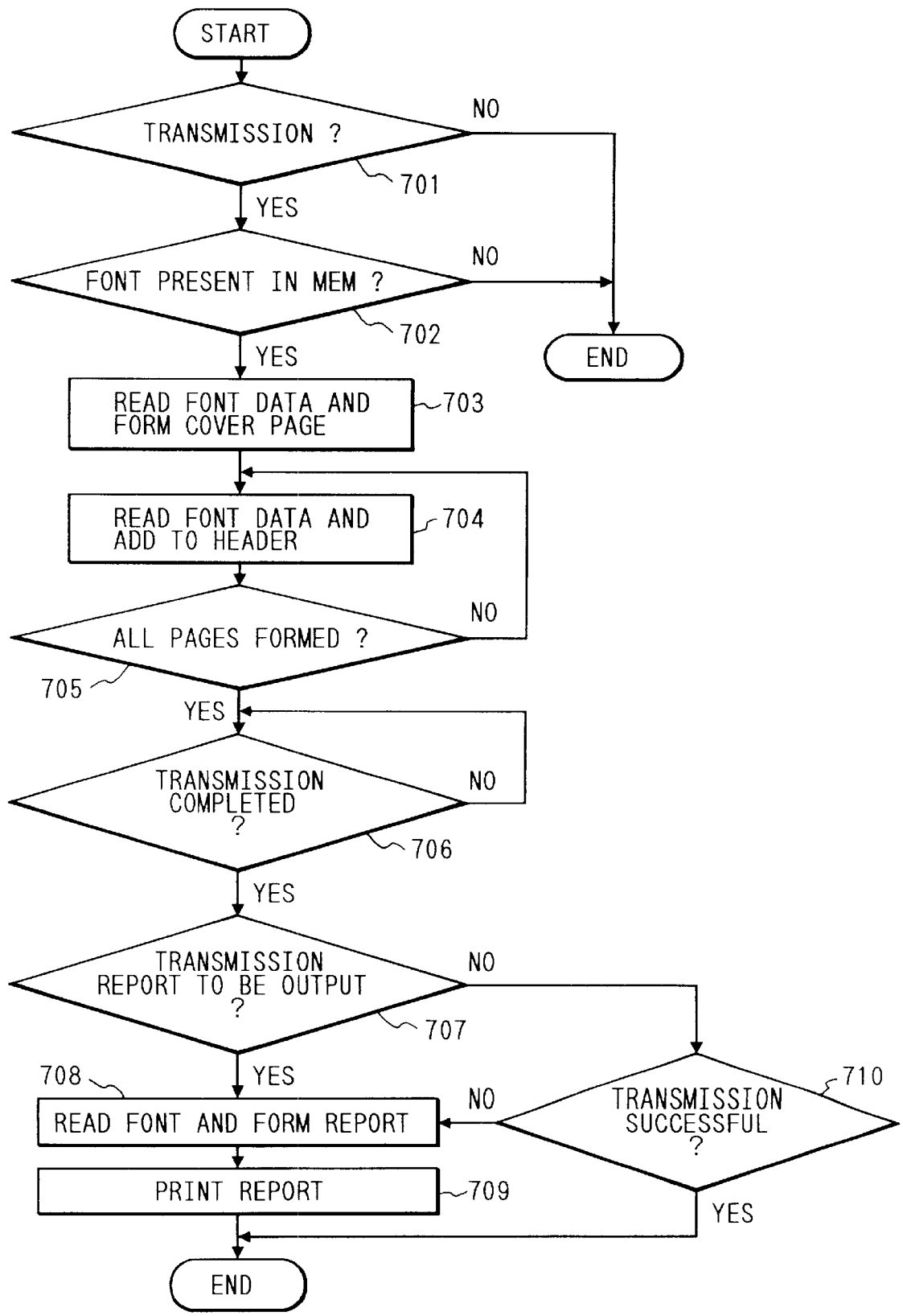
FIG. 7 is a flow chart showing a transmission sequence.

Now reference is made to FIG. 7 for explaining a transmission process.

At first the main control unit 2a discriminates whether a transmission process is selected (701), and, if not, the sequence is terminated. In case the transmission process is selected, it discriminates whether a necessary font is present in the memory 2g (702), and, if not, the sequence is terminated. In case the font is present in the memory 2g, it automatically prepare a cover page by reading the font data on the name and telephone number of the destination, the name and telephone number of this facsimile apparatus, the time of call and the message according to a predetermined format, and sends said cover page as a first page to the destination (703). In the facsimile transmission, sender information such as the time of transmission, name and telephone number of the sender, are usually added to the upper end portion of each page, and the font data corresponding to such information are read and synthesized to the leading portion of each page (704). When the sender information is prepared for all the pages (705), there is awaited the completion of transmission (706).

Upon completion of the transmission, there is discriminated whether the operation unit 2e has been so set as to print a transmission result report (707).

If set, the font data corresponding to the name and telephone number of the destination, the result of communication, the error information etc. are read from the memory and developed into a dot image in a predetermined format (708), and the recorder unit 2c is caused to print the transmission result report. Even in case the printing of the transmission result report is not selected, if the communication is not completed in normal manner, a transmission result report is prepared (708) and is printed by the recorder unit 2c (709).

As explained in the foregoing, the font received from the information processing apparatus is not merely printed, but the information necessary for the destination can be printed as image information, so that there can be improved the man-machine interface with the user at the destination.

Also the burden on the information processing apparatus can be reduced, since the dot image development is conducted by the judgment of the facsimile apparatus and it is no longer necessary to send the character information to said information processing apparatus whenever necessary and to return the dot image developed therein to the facsimile apparatus, or to monitor the timing of dot image development in the information processing apparatus.

[5th embodiment]

Figure 8:
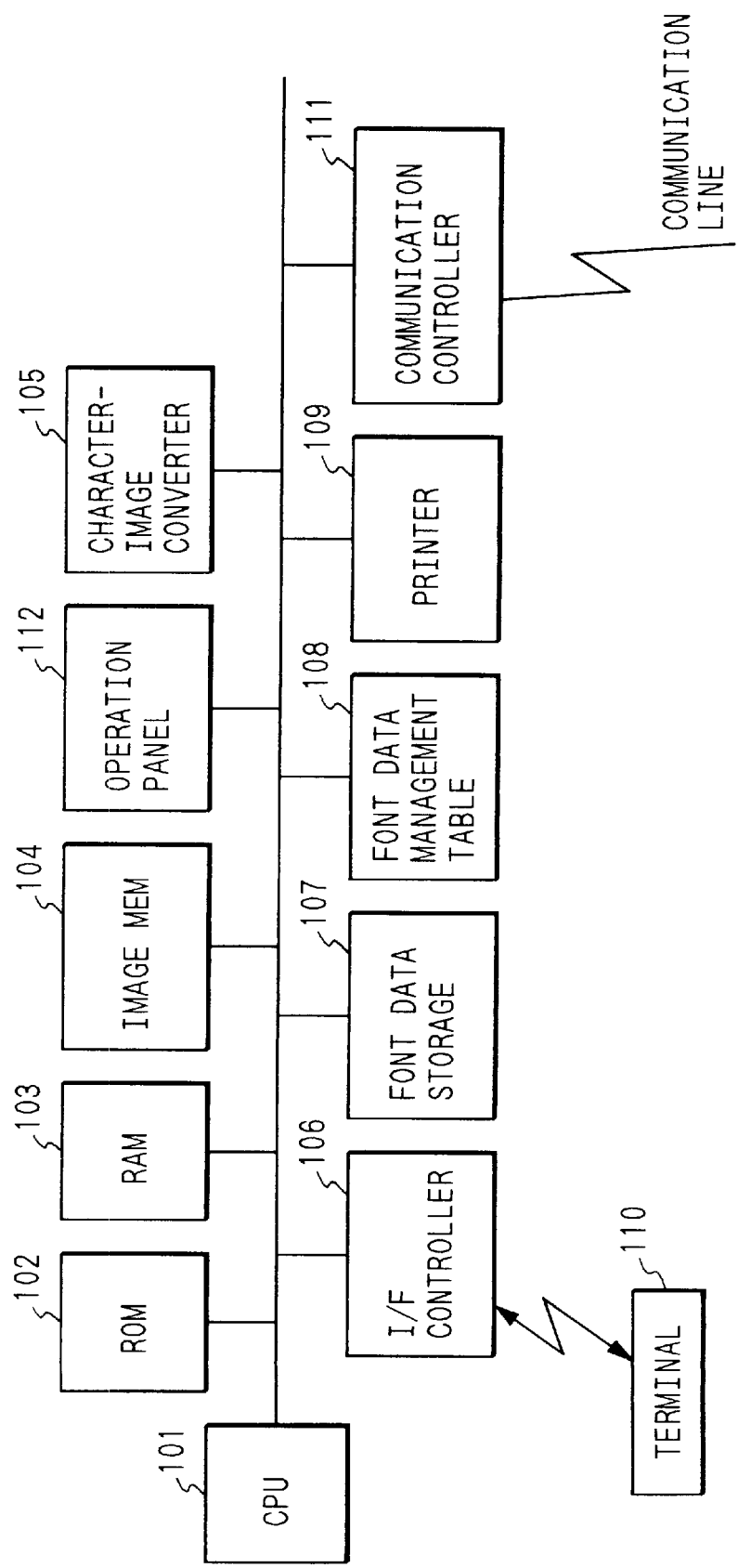
FIG. 8 is a block diagram showing configuration of a facsimile apparatus constituting a representative embodiment of the present invention.

FIG. 8 is a block diagram of a facsimile apparatus constituting a representative embodiment of the present invention. Said facsimile apparatus is adapted to convert character data, transferred from another information processing apparatus (hereinafter called terminal device) into image data and to transmit said image data as facsimile data to a communication line.

Referring to FIG. 8, there are provided a CPU 101 constituting a system control unit for controlling the entire apparatus; a ROM 102 constituting a memory area for storing control programs to be executed by the CPU 101; a RAM 103 constituting a work area in the execution of the control programs by the CPU 101; an image memory 104 composed for example of a DRAM and serving to store image data; and a character/image data conversion unit 105 for converting the character data, transferred from a terminal device 110 through an interface control unit 106, into image data. The terminal device 110 and the interface control unit 106 of the facsimile apparatus are connected through an interface such as RS232C.

A font data storage unit 107, composed for example of a SRAM, stores font data loaded from the ROM at the initialization of the apparatus. A font data management table 108, composed for example of a SRAM, stores address of font data of each character and size (numbers of lines and dots) of the font.

A printer unit 109 prints a page image generated in the character/image data conversion unit 105 or image data in the unit of a page, received through a communication control unit 111. An operation panel, provided with a keyboard and an LCD, serves to enter various instructions relating to the facsimile communication and to display messages indicating the state of the apparatus.

The facsimile apparatus of the present embodiment processes the character data according to the standard ASCII code system, unless otherwise requested from the terminal device. Consequently the font data management table 108 stores the character codes, character sizes and font data addresses of the font data storage unit 107 according to the ASCII code system, in the initialization process to be explained in the following.

In the following there will be explained the functions of the above-explained facsimile apparatus.

(1) Initialization

Figure 9:
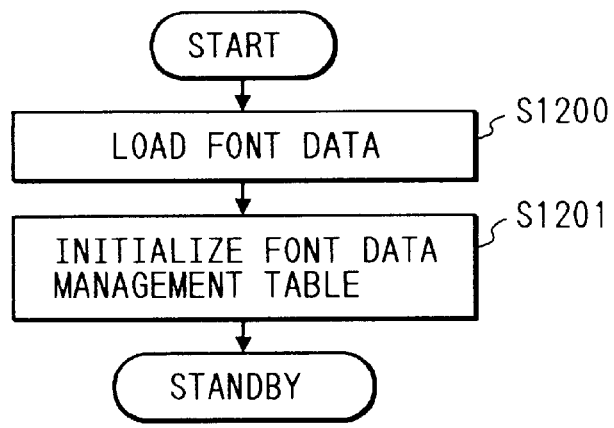
FIG. 9 is a flow chart showing a font data loading sequence in the initialization of the facsimile apparatus.

FIG. 9 is a flow chart showing a font data loading sequence in the initialization of the facsimile apparatus.

At first in a step S1200, in response to the depression of a system reset button (not shown) of the facsimile apparatus or the closing of a power switch, the font data stored in a predetermined area of the ROM 102 are read and stored in a predetermined area of the SRAM of the font data storage unit 107 (font data loading). Then a step S1201 writes management information, corresponding to thus loaded font data, into the font data management table 108, which consists of numbers of lines and bits of the font data corresponding one-to-one to each character code, and storage addresses of the font image data. After this step, the facsimile apparatus enters a stand-by state.

Figure 10:
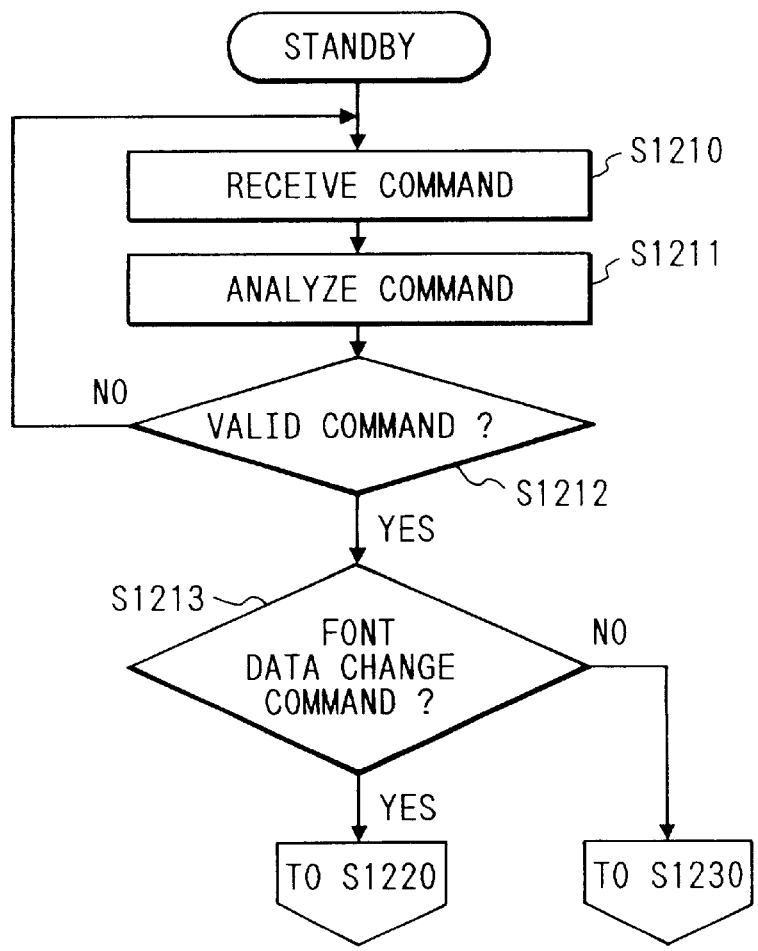
FIGS. 10 to 12 are flow charts showing sequences when information is received from a terminal device 110.
Figure 11:
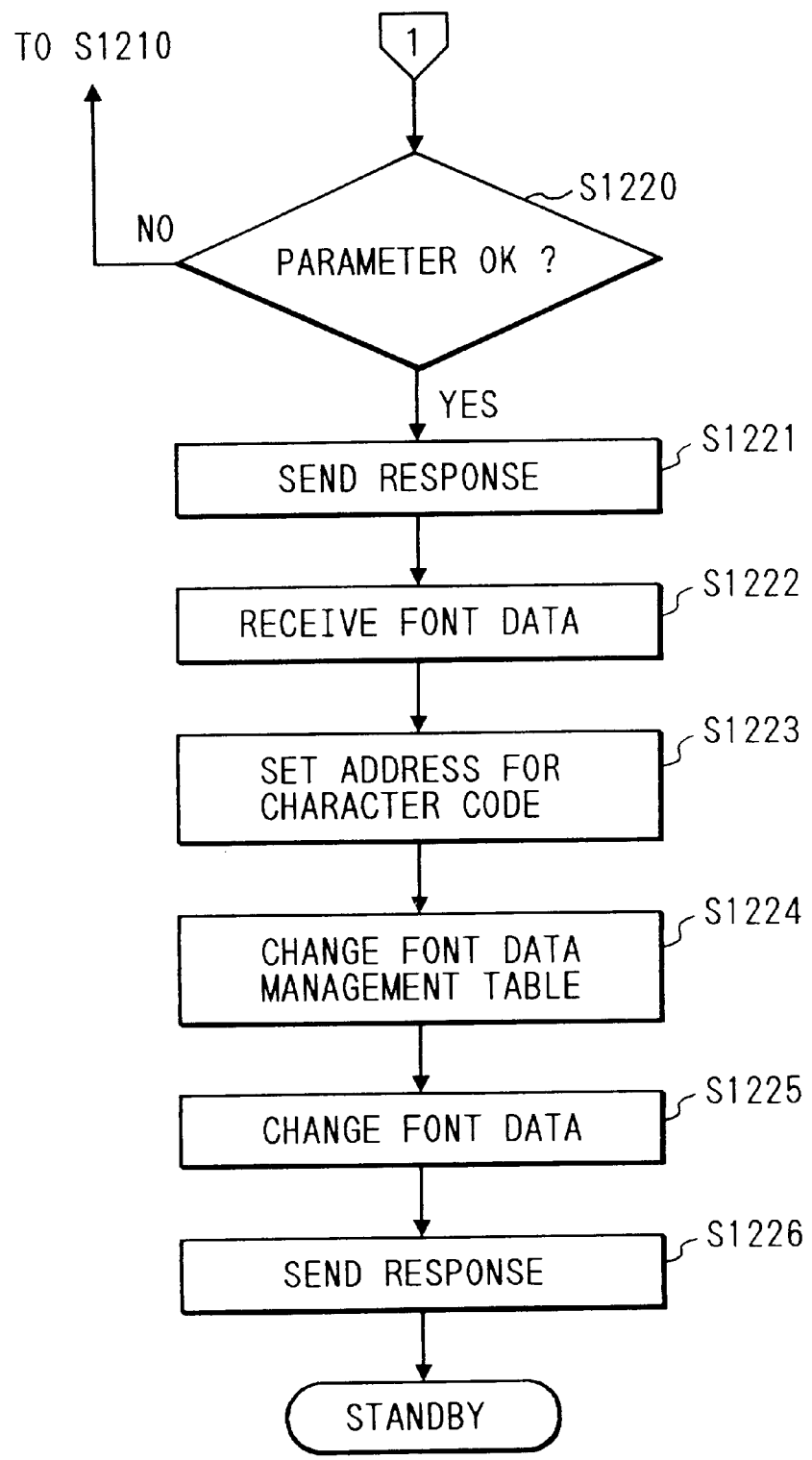
Figure 12:
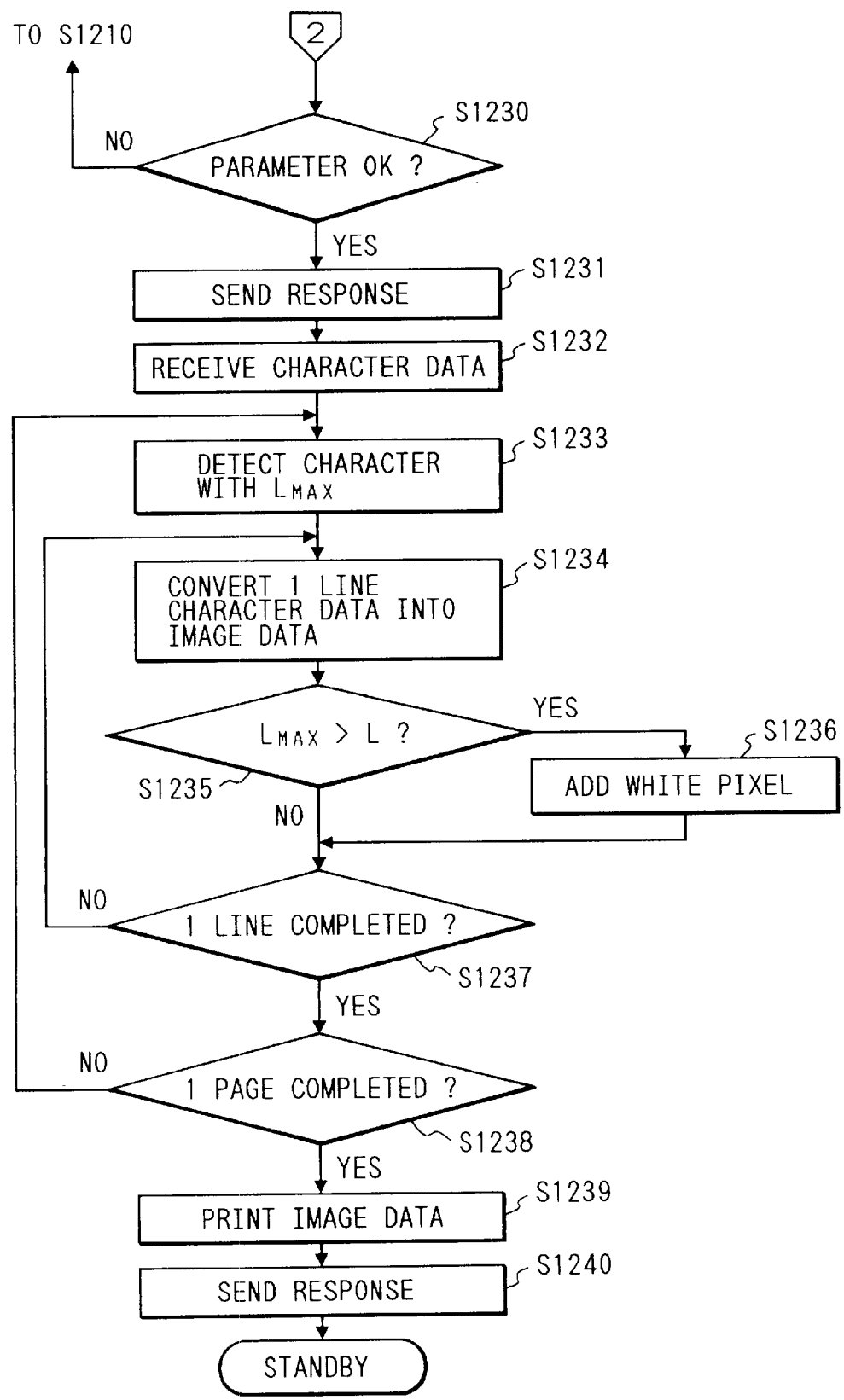

(2) Information reception from terminal device:

FIGS. 10 to 12 are flow charts showing the sequences when information is received from the terminal device 110.

At first a step S1210 receives a command, transmitted from the terminal 110, by the interface control unit 106. Then, in a step S1211, the interface control unit 106 stores the command data from the terminal 110 and analyzes thus received command. A step S1212 discriminates whether thus analyzed command is valid, and the sequence returns to the step S1210 if the command is invalid, or proceeds to a step S1213 if it is valid. A step S1213 discriminates whether said command is a font data changing command or an ASCII print command, and the sequence respective proceeds to a step S1220 or S1230.

The font data changing command mentioned above is a command for handling the character codes, not in the standard ASCII code system provided in the facsimile apparatus but in another code system such as EBCDIC, EUC or JIS code system, or in a different font system (such as Courrier, Gothic or Ming font) even in the same code system.

Then a step S1220 reads the data, in the unit of a byte, from a reception buffer of the interface control unit 106 and analyzes parameters associated with the received command. In the present embodiment, as shown in FIG. 13, said parameters consist of a character code and a number of lines (vertical size) and a number of dots (horizontal size) of the font. If the values of such parameters are identified proper, the sequence proceeds to a step S1221 to transmit a response (ACK). On the other hand, if the values of such parameters are identified improper, the sequence returns to the step S1210.

A next step S1222 receives font data transmitted by the terminal 110 in response to the ACK reception and analyzes said font data in the reception buffer of the interface control unit 106. Then a step S1223 calculates a storage address of the font data storage unit 107 corresponding to the character code designated by the above-mentioned parameters, and a step S1224 stores the numbers of lines and dots designated by the foregoing parameters and the font data storage address calculated in the step S1223, into the font data management table 108. FIG. 14 shows the structure of said font data management table 108. In this table, as shown in FIG. 14, the vertical and horizontal sizes of the character and the storage address in the font data storage unit 107 are managed corresponding to each character code.

A next step S1225 stores the font data temporarily stored in the reception buffer of the interface control unit 106, starting from the font data storage address calculated in the step S1223.

Finally a step S1226 confirms that the content of the font data has been changed by the process of the step S1225, and sends a response, indicating the completion of change of the font data, to the terminal 110.

FIG. 13 summarizes the transmission and reception of the data and responses relating to the font data changing process, between the terminal 110 and the facsimile apparatus.

On the other hand, if the sequence proceeds to a step S1230, the data are read in the unit of a byte from the reception buffer of the interface control unit 106, and the parameters associated with the received command are analyzed. If the analyzed parameters are proper, the sequence proceeds to a step S1231 to transmit a response (ACK) to the terminal 110, but, if said parameters are improper, the sequence returns to the step S1210.

A next step S1232 receives the ASCII character data transmitted by the terminal 110 in response to the ACK reception, and stores said data in the reception buffer of the interface control unit 106. In the present embodiment, the data are processed for each line of the characters. A step S1233 detects a character having the maximum line number (Lmax) within a line of the characters.

Then a step S1234 converts the character data of a line of the characters into image data. In this operation, the character/image data conversion unit 105 reconstructs the font data into the image data, according to the numbers of lines and dots in the font data management table 108. A step S1235 compares the maximum line number Lmax of the processed character line with the data line number L of each character, and, if Lmax>L, the sequence proceeds to a step S1236 to add white pixels by the number of pixels smaller than Lmax. On the other hand, if Lmax=L, the sequence immediately proceeds to a step S1237. The steps S1234 to S1237 are repeated until one line of characters is processed, and, when the step S1237 identifies that the processing of the line of characters has been completed, the sequence proceeds to a step S1238.

The step S1238 discriminates whether the conversion of the character data of a page into the image data has been completed, and, if completed, the sequence proceeds to a step S1239, but, if not completed, the sequence returns to the step S1233 to repeat the processes of the steps S1233–S1238 until the processing of said page is completed.

Finally the step S1239 effects printing of the image data by sending, if necessary, a print request to the printer unit 109, or transmits the image data to a destination desired by the user. Subsequently a step S1240 sends a response to the terminal 110 and returns to the stand-by state.

As explained in the foregoing, the font data of a code system desired by the user are stored in the facsimile apparatus and managed therein, and the user transfers the character data of said code system to the facsimile apparatus, whereby the facsimile apparatus executes character-to-image conversion according to said code system.

Consequently, according to the present embodiment, if the user wishes facsimile transmission with character codes according to a code system other than the standard code system of the facsimile apparatus, the user can in advance transfer the font data according to the code system desired by the user to the facsimile apparatus for management therein, whereby the character-to-image conversion can be executed in the code system desired by the user.

Thus the present embodiment allows dynamic change of the code system usable in the facsimile apparatus according to the intention of the user, as that the font data of a large amount according to plural code systems need not be stored in advance in the apparatus. Consequently it is rendered possible to reduce the capacity of the memory for storing the font data.

The facsimile apparatus of the above-explained embodiment is not provided with a scanner for reading the original image, but the present invention is naturally limited by such configuration. The facsimile apparatus may naturally be provided, as in the conventional configuration, with a scanner for reading the original image for facsimile transmission.

Also in the foregoing embodiment, the communication with the terminal device is conducted through an interface RS232C, but the present invention is not limited by such configuration and may utilize, for example a LAN such as Ethernet for achieving faster communication.

The present invention is applicable not only to a system consisting of plural equipment, but also to an apparatus consisting of a single equipment. It is naturally applicable also to a case it is achieved by the supply of a program to a system or an apparatus.

According to the present invention, as explained in the foregoing, the font data stored in the first memory means for conversion of the received character data into the image data are changed according to the information transferred from the external apparatus. Consequently the conversion into the image data can be achieved with the font data dynamically matching the intension of the user, without an increase in the capacity of the first memory means, and the facsimile transmission can be achieved with the image data in a representation matching the intension of the user.

What is claimed is:

1. A document processing apparatus communicating with an information processing apparatus, said document processing apparatus comprising:

first transmission means for, in order to output a document, transmitting to the information processing apparatus (1) a font request which requests the information processing apparatus to send font data corresponding to a plurality of characters required to form an image of the document to said document processing apparatus and (2) a code request which requests the information processing apparatus to assign a specific code to the plurality of characters required to form the image and send the assigned specific code to said document processing apparatus;

first reception means for receiving, from the information processing apparatus in response to the font request and the code request transmitted by said first transmission means, the font data and the specific code;

second transmission means for, in order to output a subsequent document, transmitting the specific code received by said first reception means back to the information processing apparatus;

second reception means for receiving, from the information processing apparatus, font data in response to the specific code transmitted by said second transmission means; and output means for generating and outputting an image of a document based on the font data received by either one of said first and second reception means.

2. A document processing apparatus according to claim 1, wherein each document includes information indicating a data of a communication, a sender or a receiver of the communication, and a communication result.

3. A document processing apparatus according to claim 1, further comprising:

first designation means for designating an entire font deletion mode;

second designation means for designating a partial font deletion mode; and deletion means for, in the entire font deletion mode, deleting all of the received font data after said output means has output a document, and, in the partial font deletion mode, for selectively deleting ones of the received font data based on respective usage frequencies thereof.

4. A document processing apparatus according to claim 1, further comprising a memory for storing data, wherein an area of the memory stores each received font data, and wherein the area for storing the received font data is used for substituted reception or memory transmission.

5. A document processing apparatus according to claim 1, wherein the document comprises a communication management report.

6. A document processing apparatus according to claim 1, wherein said document processing apparatus is a facsimile apparatus.

7. A document processing apparatus according to claim 1, wherein said output means comprises a printer.

8. A method operative in a document processing apparatus communicating with an information processing apparatus, said method comprising:

a first transmission step of, in order to output a document, transmitting to the information processing apparatus (1) a font request which requests the information processing apparatus to send font data corresponding to a plurality of characters required to form an image of the document to said document processing apparatus and (2) a code request which requests the information processing apparatus to assign a specific code to the plurality of characters required to form the image and send the assigned specific code to said document processing apparatus;

a first reception step of receiving, from the information processing apparatus in response to font request and the code request transmitted at said first transmission step, the font data and the specific code;

a second transmission step of, in order to output a subsequent document, transmitting the specific code received at said first reception step back to the information processing apparatus;

a second reception step of receiving, from the information processing apparatus, font data in response to the specific code transmitted at said second transmission step; and an output step of generating and outputting an image of a document based on the font data received at either one of said first and second reception steps.

9. A method according to claim 8, wherein each document includes information indicating a data of a communication, a sender or receiver of the communication, and a communication result.

10. A method according to claim 8, further comprising:

a designation step of selectively designating one of an entire font deletion mode and a partial font deletion mode; and a deletion step of, in the entire font deletion mode, deleting all of the received font data after said output step has output a document, and, in the partial font deletion mode, selectively deleting ones of the received font data based on respective usage frequencies thereof.

11. A method according to claim 8, wherein the document processing apparatus includes a memory for storing data, wherein an area of the memory stores each received font data, and wherein the area for storing the received font data is used for substituted reception or memory transmission.

12. A computer-readable storage medium containing a computer program for performing a method operative in a document processing apparatus communicating with an information processing apparatus, said document processing apparatus, said method comprising:

a first transmission step of, in order to output a document, transmitting to the information processing apparatus (1) a font request which requests the information processing apparatus to send font data corresponding to a plurality of characters required to form an image of the document to said document processing apparatus and (2) a code request which requests the information processing apparatus to assign a specific code to the plurality of characters required to form the image and send the assigned specific code to said document processing apparatus;

a first reception step of receiving, from the information processing apparatus in response to font request and the code request transmitted at said first transmission step, the font data and the specific code;

a second transmission step of, in order to output a subsequent document, transmitting the specific code received at said first reception step back to the information processing apparatus;

a second reception step of receiving, from the information processing apparatus, font data in response to the specific code transmitted at said second transmission step; and an output step of generating and outputting an image of a document based on the font data received at either one of said first and second reception steps.

\* \* \* \* \*

UNITED STATES PATENT AND TRADEMARK OFFICE
CERTIFICATE OF CORRECTION

PATENT NO. : 5,946,105

DATED : August 31, 1999

INVENTOR(S) : KAZUOMI OISHI ET AL.

Page 1 of 3

It is certified that error appears in the above-identified patent and that said Letters Patent is hereby corrected as shown below:

Title page, item
[75] INVENTORS:

"Λkemi Nishimaki" should read --Akemi Nishimaki--.

[57] ABSTRACT

"ΛBSTRACT" should read --ABSTRACT--.

COLUMN 2

Line 26, "Also" should read --Also,--.

COLUMN 3

Line 60, "Also" should read --Also,--.

COLUMN 5

Line 56, "display." should read --display--.

COLUMN 8

Line 26, "response" should read --response,--.

UNITED STATES PATENT AND TRADEMARK OFFICE
CERTIFICATE OF CORRECTION

PATENT NO.   : 5,946,105

DATED          : August 31, 1999

INVENTOR(S) : KAZUOMI OISHI ET AL.

It is certified that error appears in the above-identified patent and that said Letters Patent is hereby corrected as shown below:

COLUMN 9

Line 43, "Also" should read --Also,--.

COLUMN 10

Line 16, "following" should read --following,--.

COLUMN 11

Line 22, "prepare" should read --prepares--.

COLUMN 12 line 29, "Consequently" should read --Consequently,--.

UNITED STATES PATENT AND TRADEMARK OFFICE
CERTIFICATE OF CORRECTION

PATENT NO. : 5,946,105

DATED : August 31, 1999

INVENTOR(S) : KAZUOMI OISHI ET AL.

It is certified that error appears in the above-identified patent and that said Letters Patent is hereby corrected as shown below:

COLUMN 14

Line 56, "intension" should read --intention--.

Signed and Sealed this

Twenty-sixth Day of December, 2000

*Attest:*

Q. TODD DICKINSON

*Attesting Officer*      *Director of Patents and Trademarks*